United States Patent
Peterson et al.

(10) Patent No.: US 12,259,881 B2
(45) Date of Patent: Mar. 25, 2025

(54) AUTOMATICALLY SEARCHING FOR TOPICS RELATED TO DISCOVERED DEVICES

(71) Applicant: Lenovo (United States) Inc., Morrisville, NC (US)

(72) Inventors: Nathan Peterson, Oxford, NC (US); Gary D. Cudak, Wake Forest, NC (US); John M. Petersen, Wake Forest, NC (US)

(73) Assignee: Lenovo (United States) Inc., Morrisville, NC (US)

( * ) Notice: Subject to any disclaimer, the term of this patent is extended or adjusted under 35 U.S.C. 154(b) by 150 days.

(21) Appl. No.: 17/707,155

(22) Filed: Mar. 29, 2022

(65) Prior Publication Data
US 2023/0315724 A1   Oct. 5, 2023

(51) Int. Cl.
  *G06F 16/245*  (2019.01)
  *G06F 16/95*  (2019.01)
(52) U.S. Cl.
  CPC ............ *G06F 16/245* (2019.01); *G06F 16/95* (2019.01)
(58) Field of Classification Search
  CPC ............ G06F 16/1827; G06F 16/2246; G06F 16/24553; G06F 16/907–909; G06F 16/95; G06F 16/951; G06F 16/953; G06F 16/9532; G06F 16/245
  See application file for complete search history.

(56) References Cited

U.S. PATENT DOCUMENTS

| | | | |
|---|---|---|---|
| 10,776,131 B2* | 9/2020 | Liu | G06F 3/0679 |
| 2012/0296931 A1* | 11/2012 | Fujita | G06F 16/24534 |
| | | | 707/769 |
| 2013/0151531 A1* | 6/2013 | Li | G06Q 50/01 |
| | | | 707/E17.089 |
| 2014/0201240 A1* | 7/2014 | Andavarapu | H04L 51/10 |
| | | | 707/771 |
| 2014/0244768 A1* | 8/2014 | Shuman | H04W 4/70 |
| | | | 709/206 |
| 2015/0019342 A1* | 1/2015 | Gupta | G06Q 30/0269 |
| | | | 705/14.66 |
| 2016/0292219 A1* | 10/2016 | Prabhakar | G06F 16/35 |
| 2017/0308248 A1* | 10/2017 | Choi | G08C 17/02 |
| 2018/0088566 A1* | 3/2018 | Billi-Duran | G05B 19/41885 |
| 2023/0138036 A1* | 5/2023 | Lu | H04M 1/724631 |
| | | | 455/418 |

FOREIGN PATENT DOCUMENTS

EP      3702938 A1 *  9/2020    ....... G06F 16/24578

* cited by examiner

*Primary Examiner* — James E Richardson
(74) *Attorney, Agent, or Firm* — Kunzler Bean & Adamson

(57) ABSTRACT

Methods, apparatus, and computer program products that can automatically search for topics related to discovered devices are disclosed herein. One method includes a processor discovering a device and automatically searching a set of data resources on a network for a set of topics related to the discovered device. Apparatus and computer program products that include hardware and/or software that can perform the methods for automatically searching for topics related to a discovered device are also disclosed herein.

20 Claims, 11 Drawing Sheets

AUTOMATICALLY SEARCHING FOR TOPICS RELATED TO DISCOVERED DEVICES

FIELD

The subject matter disclosed herein relates to computing devices and, more particularly, relates to automatically searching for topics related to discovered devices.

BACKGROUND

Current environments may include multiple devices therein. At least some of these devices do not have a way of informing a user of known issues for a particular device. Moreover, users are typically unaware of issues that may be experienced by a particular device until the device actually experiences an issue. As such, there is not any current way of proactively informing a user of known issues for a particular device.

BRIEF SUMMARY

Apparatus, methods, and computer program products that can automatically search for topics related to discovered devices are disclosed herein. An apparatus, in one embodiment, includes a processor and a memory that stores code executable by the processor. In certain embodiments, the code is executable by the processor to discover a device and automatically search a set of data resources on a network for a set of topics related to the discovered device.

One embodiment of a method that can automatically search for topics related to discovered devices includes a processor discovering a device. In some embodiments, the method further includes the processor automatically searching a set of data resources on a network for a set of topics related to the discovered device.

A computer program product that can automatically search for topics related to discovered devices includes a computer-readable storage medium including program instructions embodied therewith. In certain embodiments, the program instructions are executable by a processor to cause the processor to discover a device and automatically search a set of data resources on a network for a set of topics related to the discovered device.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1A:
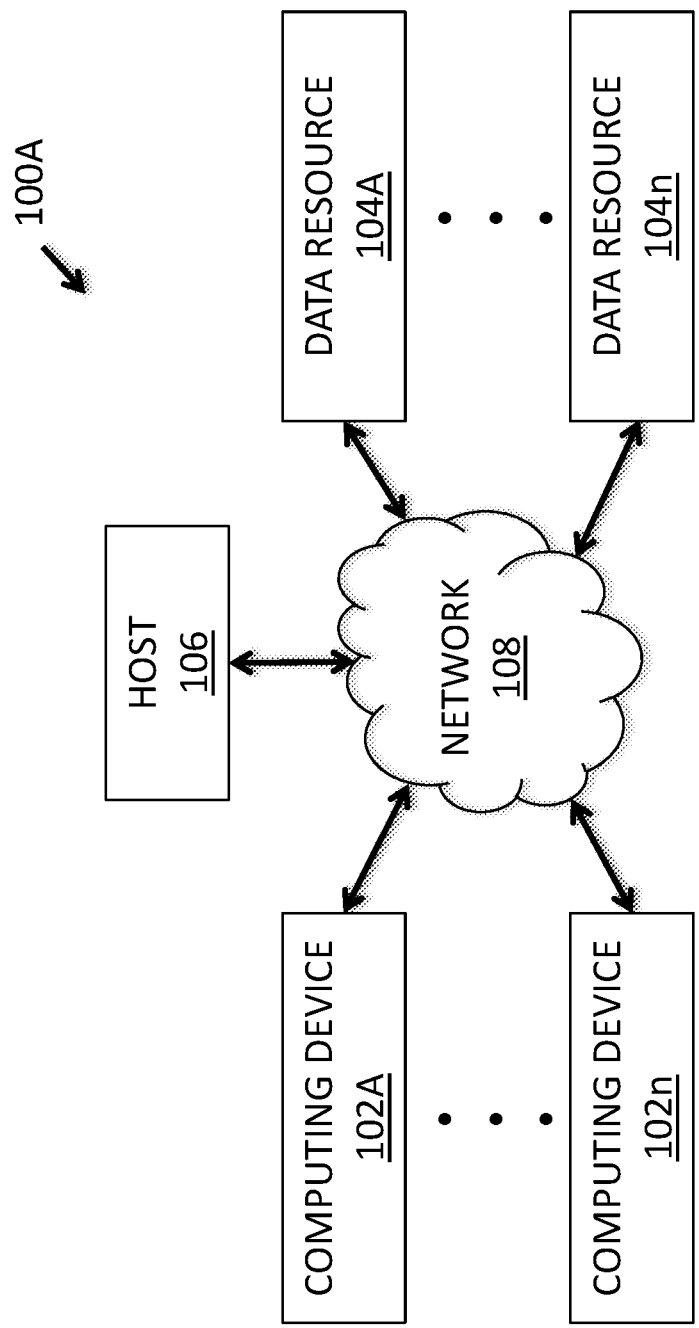
FIGS. 1A through 1C are schematic diagrams illustrating various embodiments of a computing system that can automatically search for topics related to a discovered device.

As will be appreciated by one skilled in the art, aspects of the embodiments may be embodied as a system, apparatus, method, or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to emphasize their implementation independence more particularly. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

In addition, as used herein, the term, "set," can mean one or more, unless expressly specified otherwise. The term, "sets," can mean multiples of or a plurality of one or mores, ones or more, and/or ones or mores consistent with set theory, unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Various embodiments disclosed herein provide apparatus, methods, and computer program products that can automatically (and/or proactively) search for topics related to discovered devices. An apparatus, in one embodiment, includes a processor and a memory that stores code executable by the processor. In certain embodiments, the code is executable by the processor to discover a device and automatically search a set of data resources on a network for a set of topics related to the device.

One embodiment of a method that can automatically search for topics related to discovered devices includes a processor discovering a device. In some embodiments, the method further includes automatically search a set of data resources on a network for a set of topics related to the device.

A computer program product that can automatically search for topics related to discovered devices includes a computer-readable storage medium including program instructions embodied therewith. In certain embodiments, the program instructions are executable by a processor to cause the processor to discover a device and automatically search a set of data resources on a network for a set of topics related to the device.

Figure 1B:
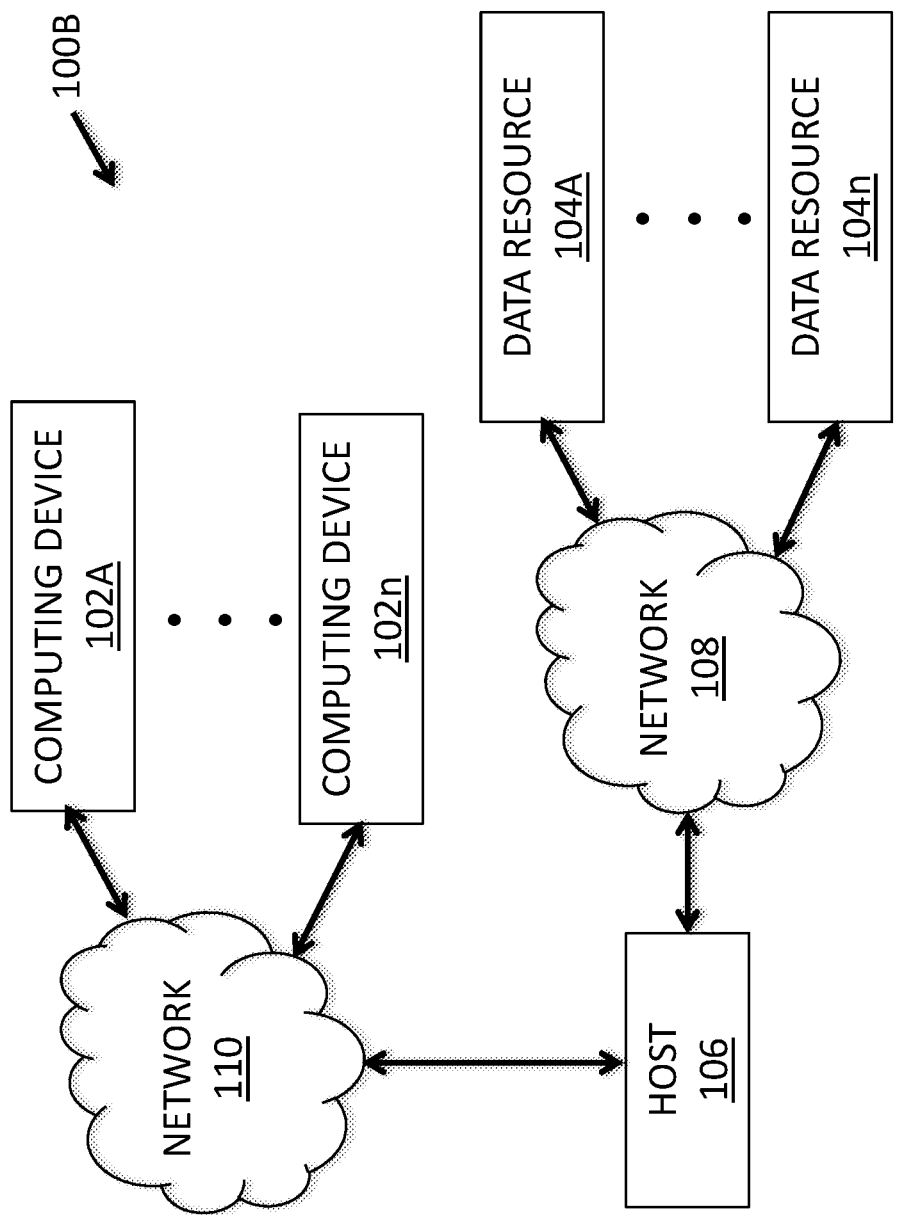
Figure 1C:
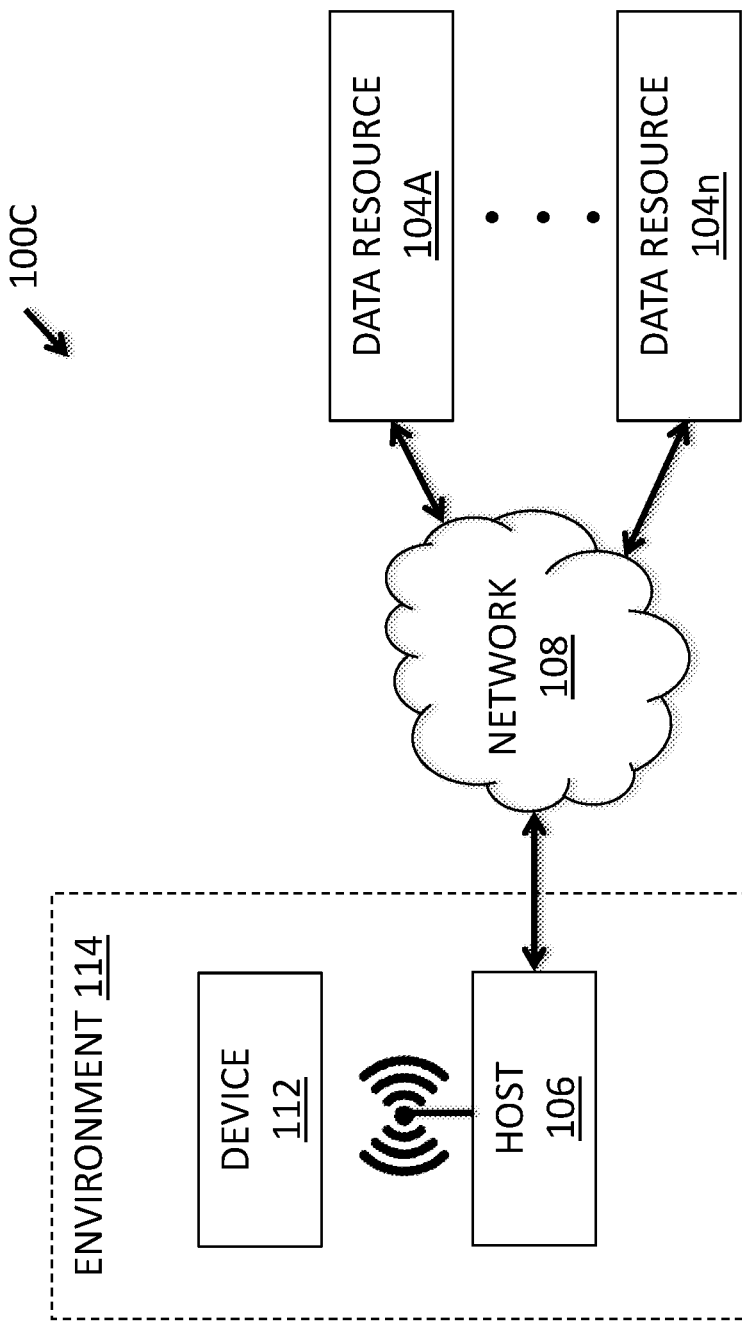

Turning now to the drawings, FIGS. 1A through 1C are block diagrams of various embodiments of a computing system 100A, a computing system 100B, and a computing system 100C, respectively. Specifically, the computing systems 100A through 100C illustrated in FIGS. 1A through 1C are each configured to automatically search for topic related to a discovered device. As discussed herein, the computing systems 100A through 100C may simply be referred to individually or collectively as, computing system(s) 100.

At least in the embodiment illustrated in FIG. 1A, a computing system 100A includes, among other components and/or features, a set of computing devices 102 (e.g., computing devices 102A through 102n), a set of data resources 104 (e.g., data resources 104A through 104n), and a host computing device 106 (or host 106) coupled to and/or in communication with one another via a network 108.

A set of computing devices 102 may include any suitable quantity of computing devices 102. That is, while the illustrated embodiment of a computing system 100A includes two (2) computing devices 102 (e.g., computing device 102A and computing device 102n), various other embodiments of a computing system 100A may include one (1) computing device 102 (e.g., computing device 102A) or a quantity of computing devices 102 greater than two computing devices 102 (e.g., three (3) or more computing devices 102).

A computing device 102 may include any suitable type of computing device and/or computing device that is known or developed in the future. Examples of a computing device 102 include, but are not limited to, a laptop computer, a desktop computer, a personal digital assistant (PDA), a tablet computer, a smart phone, a cellular telephone, a smart television (e.g., televisions connected to the Internet), a wearable device (e.g., a smart watch, a smart ring, a fitness tracker, etc.), an Internet of Things (IoT) device, a game console, a vehicle on-board computer, a streaming device, a smart device, and a digital assistant, etc., among other computing devices 102 that are possible and contemplated herein.

A set of data resources 104 may include any suitable quantity of data resources 104. That is, while the illustrated embodiment of a computing system 100A includes two data resources 104 (e.g., data resource 104A and data resource 104n), various other embodiments of a computing system 100A may include one data resource 104 (e.g., data resource 104A) or a quantity of data resources 104 greater than two data resources 104 (e.g., three or more data resources 104).

In various embodiments, the set of data resources 104 is located on and/or accessible by the host 106 via a cloud network and/or the Internet (see, e.g., network 108), as discussed elsewhere herein. As further discussed elsewhere herein, the set of data resources 104 is located on and/or accessible by the host 106 via other types of networks 108 and/or specific networks 108 (e.g., data networks).

A data resource 104 may include any suitable type of computing system, computing system, type of computing device, and/or computing device, that is/are known or developed in the future that can host data, store data, display data, and/or publish data. A data resource 104 may also include, but is not limited to, a data repository, a database, a website, a webpage, an application, a blog, a message board, a social media site/page/post, and a forum, etc., among other types or data resources and/or data resources that are possible and contemplated herein.

In various embodiments, one or more data resources 104 are owned and/or managed by a different entity and/or different party than the owner and/or manager of the host computing device 106. In other words, the owner and/or manager of one or more data resources 104 is a third-party with respect to the owner and/or manager of the host computing device 106.

The data hosted, stored, displayed, and/or published on a data resource 104 can include any suitable data related to a computing device 102 (or object 112 (see. e.g., FIG. 1C)). In various embodiments, the data hosted, stored, displayed, and/or published on a data resource 104 can include one or more topics related to a computing device 102 or object 112, which can include any suitable type(s) of topic and/or specific topic(s). In certain embodiments, the type(s) of topic and/or specific topic(s) can include, but are not limited to, one or more recalls for a computing device 102 or object 112, one or more performance issues for a computing device 102 or object 112, one or more repairs for a computing device 102 or object 112, one or more warranties for a computing device 102 or object 112, and one or more new uses for a computing device 102 or object 112, among other types of topics and/or specific topics for a computing device 102 and/or or object 112 that are possible and contemplated herein.

In one non-limiting example, a data resource 104 may include an online forum that includes a discussion about one or more performance issues (e.g., a water leak) for a particular brand and/or model of smart refrigerator (e.g., a computing device 102), among other performance issues, types of computing device 102, and/or computing devices 102 that are possible and contemplated herein. The online forum (e.g., data resource 104) may be hosted, stored, displayed, and/or published, or otherwise included, on a third-party data resource 104 (e.g., a third-party computing device, a third-party website, and/or a third-party webpage, etc., among other types of data resources 104 and/or specific data resources 104 that are owned and/or managed by a third-party that are possible and contemplated herein).

A host computing device 106 may include any suitable type of computing device and/or computing device that is known or developed in the future (which can also be referred to herein generally as, an information handling device). Examples of a host computing device 106 include, but are not limited to, a smart speaker (e.g., Alexa®, Echo®, Google Home®, etc.), a smart hub, a stick device (e.g., Fire Stick®, Roku Stick®, etc.), a laptop computer, a desktop computer, a personal digital assistant (PDA), and a tablet computer, etc., among other types of computing systems/devices and/or specific computing systems/devices that can perform the functions and/or operations of a host computing device 102 discussed herein that are possible and contemplated herein.

Figure 2A:
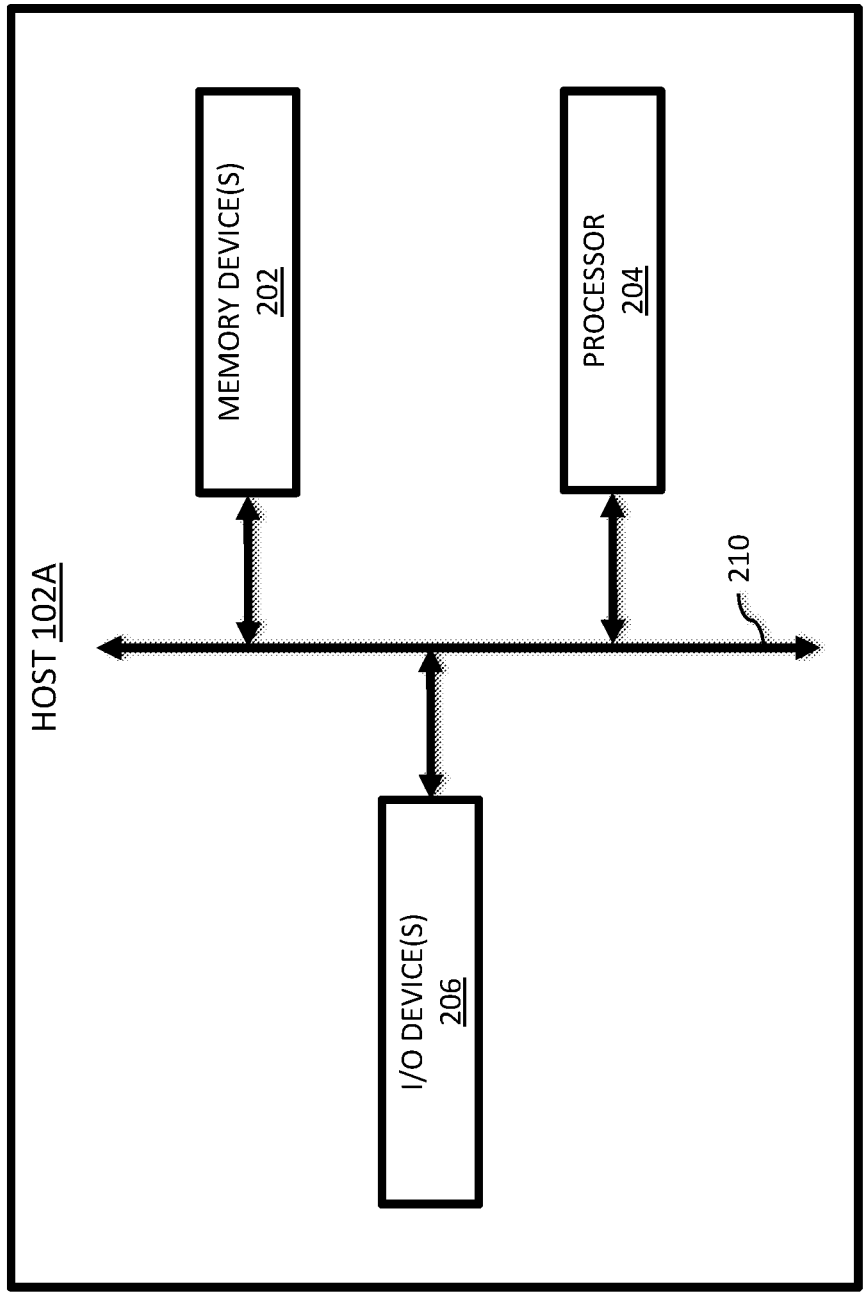
FIGS. 2A through 2D are schematic block diagrams illustrating various embodiments of a host computing device included in the computing systems of FIGS. 1A through 1C.

Referring to FIG. 2A, FIG. 2A is a block diagram of one embodiment of a host computing device 106A (or host 106A). At least in the embodiment illustrated in FIG. 2A, a host 106A includes, among other components and/or features, a set of memory devices 202, a processor 204, and a set of input/output (I/O) devices 206 coupled to and/or in communication with one another via a bus 210 (e.g., a wired and/or wireless bus).

A set of memory devices 202 may include any suitable quantity of memory devices 202. Further, a memory device 202 may include any suitable type of device and/or system that is known or developed in the future that can store computer-useable code and/or computer-readable code. In various embodiments, a memory device 202 may include one or more non-transitory computer-usable mediums (e.g., readable, writable, readable-writable, etc.), which may include any non-transitory and/or persistent apparatus or device that can contain, store, communicate, propagate, and/or transport applications, instructions, data, computer programs, software, code, routines, etc., for processing by or in connection with a computer processing device (e.g., processor 204).

A memory device 202, in some embodiments, includes volatile computer storage media. For example, a memory device 202 may include random access memory (RAM), including dynamic RAM (DRAM), synchronous dynamic RAM (SDRAM), and/or static RAM (SRAM). In other embodiments, a memory device 202 includes non-volatile computer storage media. For example, a memory device 202 may include flash memory and/or any other suitable non-volatile computer storage device that is known or developed in the future. In various embodiments, a memory device 202 includes both volatile and non-volatile computer storage media.

Figure 3A:
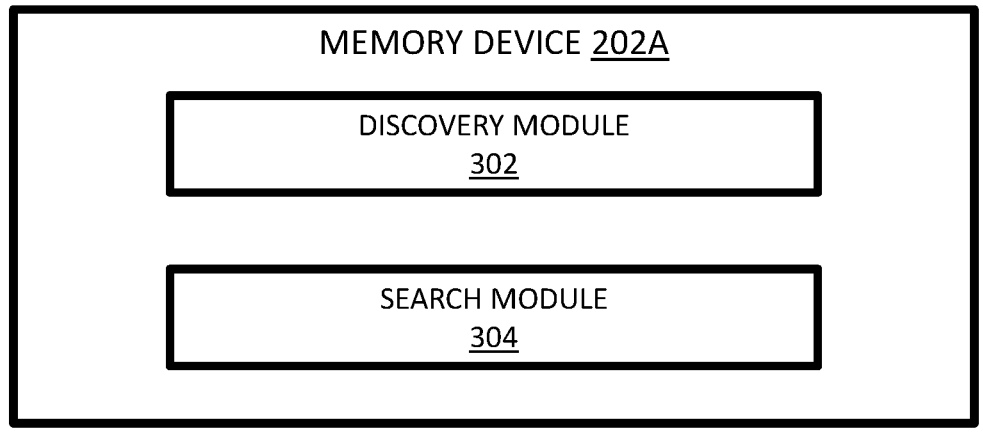
FIGS. 3A and 3B are schematic block diagrams illustrating various embodiments of a memory device included in the host computing devices of FIGS. 2A through 2D.

With reference to FIG. 3A, FIG. 3A is a block diagram of one embodiment of a memory device 202A. At least in the embodiment illustrated in FIG. 3A, a memory device 202A includes, among other components and/or features, a discovery module 302 and a search module 304 that are each configured to operate/function in conjunction with one another when executed by a processor 204 to automatically search for topics related to a discovered device (e.g., a discovered computing device 102) and/or a discovered object (e.g., a discovered object 112).

A discovery module 302 may include any suitable hardware and/or software that is known or developed in the future that can discover a computing device 102 and/or object 112. The discovery module 302 may discover a computing device 102 and/or object using any suitable technology, process, method, and/or technique that is known or developed in the future.

In various embodiments, the discovery module 302 is configured to discover a computing device 102 that is coupled to and/or in communication with a processor 204. In some embodiments, the computing device 102 can be discovered by the discovery module 302 because the computing device 102 is coupled to and/or in communication with the processor 204 via a network 108 (see, e.g., host 106A in FIG. 1A), as discussed elsewhere herein. In other embodiments, the computing device 102 can be discovered by the discovery module 302 because the computing device 102 is coupled to and/or in communication with the processor 204 via a network 110 (see, e.g., host 106 in FIG. 1B), as discussed elsewhere herein.

Figure 2B:
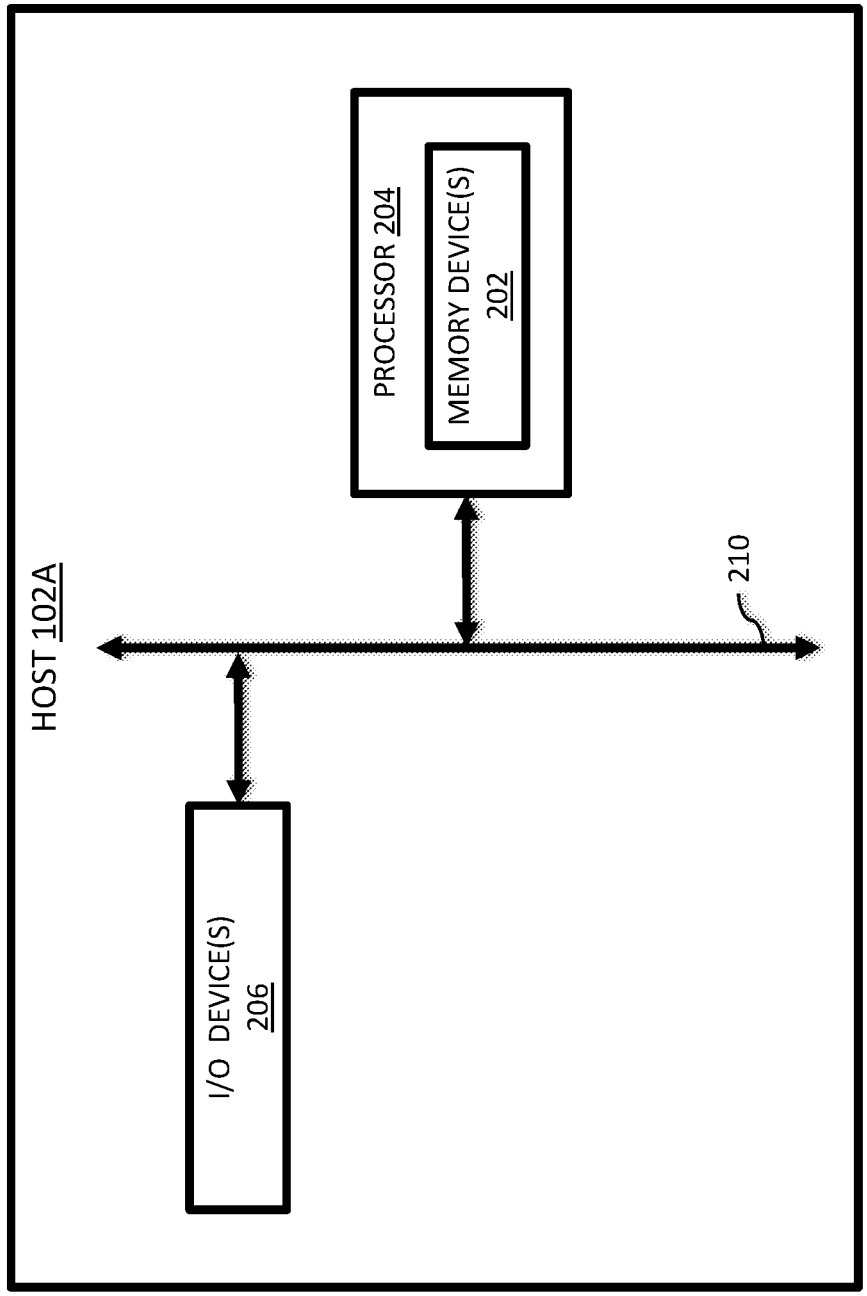
Figure 2C:
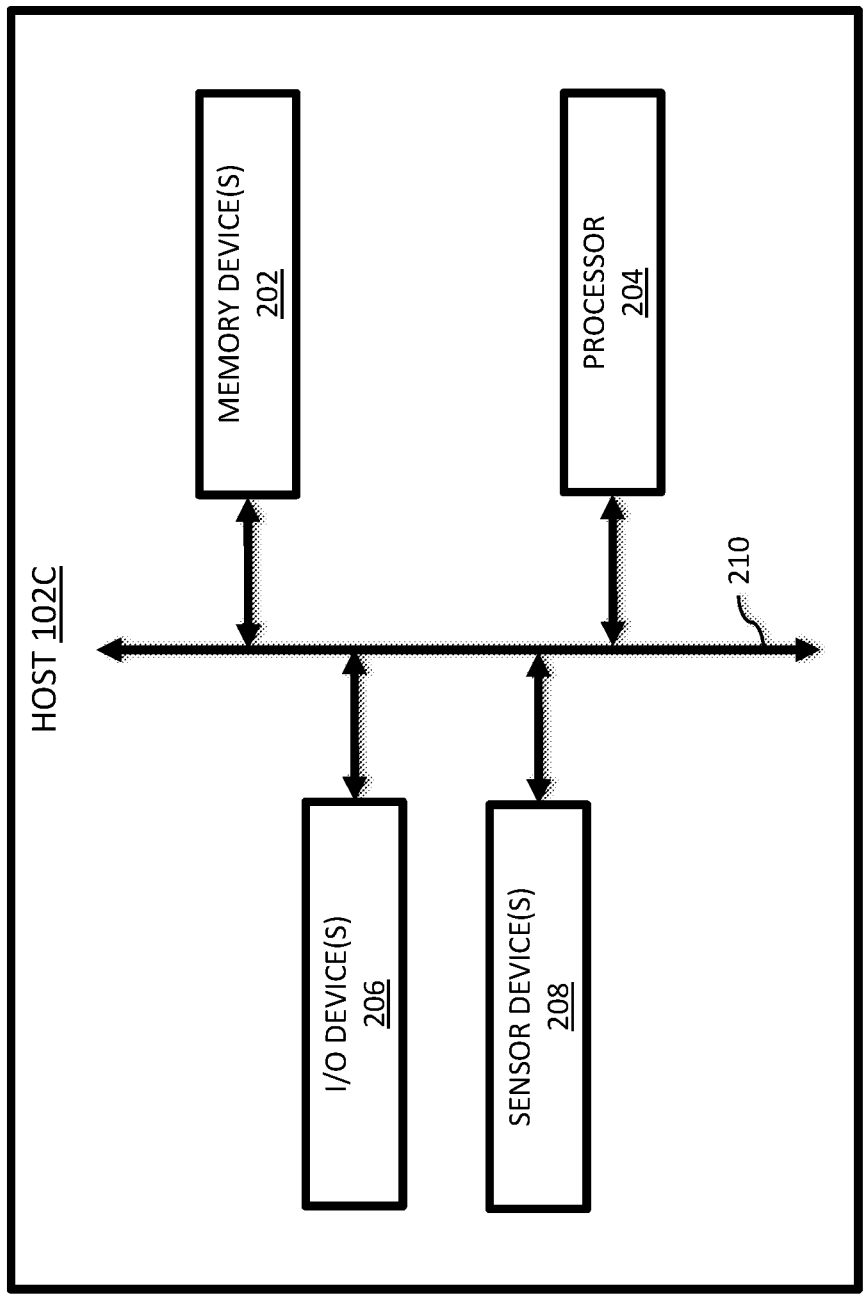
Figure 2D:
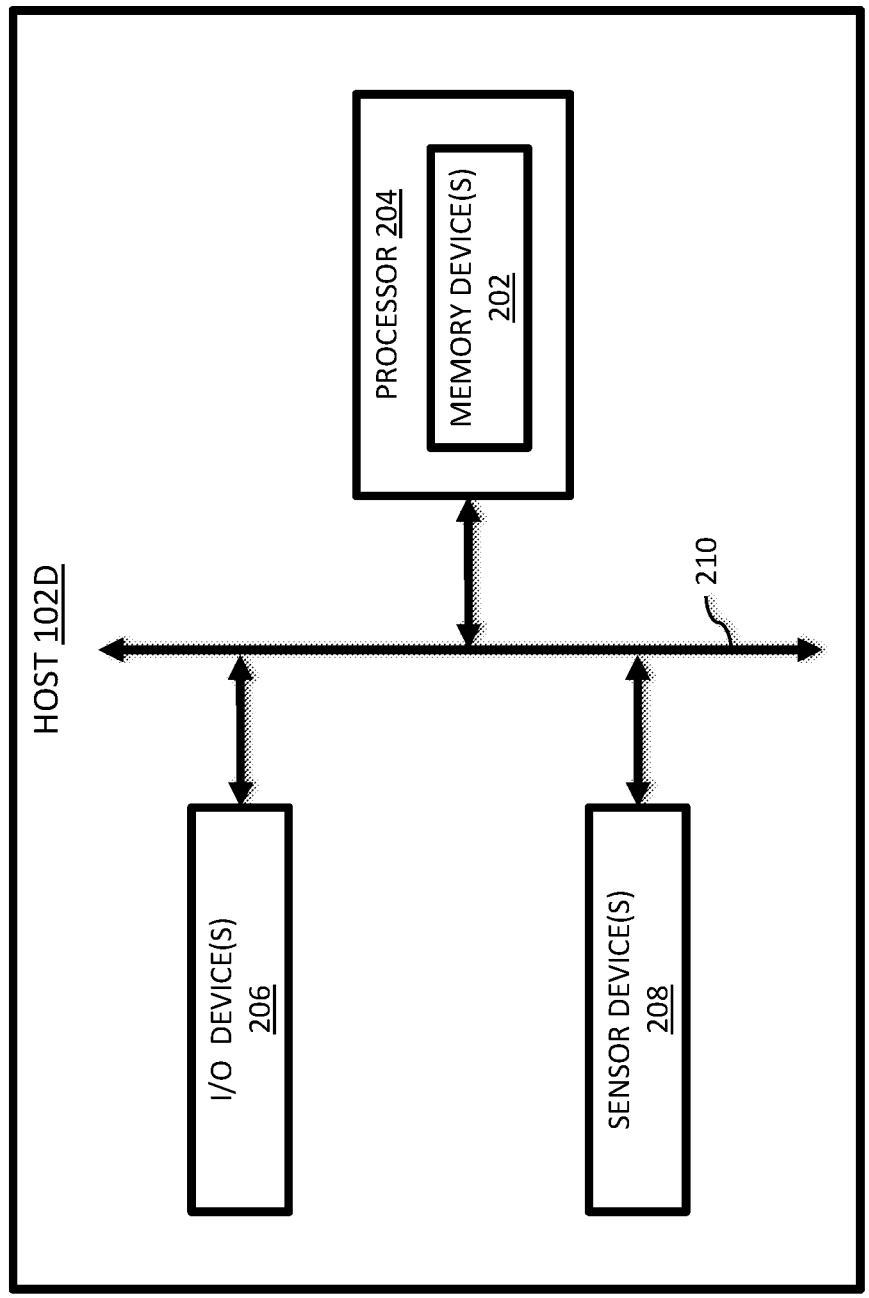

In still other embodiments, the computing device 102 can be discovered by the discovery module 302 because the computing device 102 is an object (see, e.g., object 112 in FIG. 1C) that is detectable by one or more sensor devices (see e.g., sensor device(s) 208 in FIGS. 2C and 2D) coupled to and/or in communication with the processor 204 (see, e.g., host 106 in FIG. 1C), as discussed elsewhere herein. Here, the discovery module 302 in configured to discover a computing device 102 and/or object 102 based on sensor data received from the sensor device(s) 208.

The sensor data received from the sensor device(s) can include data indicating that the computing device 102 and/or object 112 has been detected in an environment (e.g., an environment 114 in FIG. 1C), as discussed elsewhere herein. The discovery module 302 can use the detection and/or identification of the computing device 102 and/or object 112 in the environment 114 as the method, process, and/or technique of discovering the computing device 102 and/or object 112.

The discovery module 302 is configured to generate and transmit a notification to a search module 304 in response to discovering a computing device 102 and/or object 112. The notification generated by the discovery module 302 can identify one or more computing devices 102 or object(s) 112 discovered by the discovery module 302, which can include every computing device 102 and/or object 112 discovered by the discovery module 302. The search module 304 is configured to receive and process the notification generated by the discovery module 302.

A search module 304 may include any suitable hardware and/or software that can search for data in one or more data resources 104 coupled to and/or accessible by a host 106 and/or a processor 204. In various embodiments, the search module 304 is configured to search the data resource(s) 104 for one or more topics related to a discovered computing device 102 and/or discovered object 112.

The topic(s) may include any suitable type of topic and/or particular topics related, associated, and/or corresponding to a computing device 102 and/or object 112. That is, the type of topic and/or particular topics related, associated, and/or corresponding to a computing device 102 and/or object 112 may include any type(s) of topic and/or particular topic(s) related, associated, and/or corresponding to a computing device 102 and/or object 112 that is/are known or developed in the future. In various embodiments, the type of topic and/or topic can include, but is/are not limited to, one or more recalls for a computing device 102 or object 112, one or more performance issues for a computing device 102 or object 112, one or more repairs for a computing device 102 or object 112, one or more warranties for a computing device 102 or object 112, and one or more new uses for a computing device 102 or object 112, among other types of topics and/or specific topics for a computing device 102 and/or or object 112 that are possible and contemplated herein.

In some embodiments, the search module 304 is configured to search the data source(s) 104 by looking for any type of topic and/or any topic related to a discovered computing device 102 and/or discovered object 112 (e.g., a general search of the data resource(s) 104). In additional or alternative embodiments, the search module 304 is configured to search the data source(s) 104 by looking for one or more specific types of topic and/or one or more specific topics related to a discovered computing device 102 and/or discovered object 112 (e.g., one or more specific and/or one or more targeted searches of the data resource(s) 104).

The search module 304, in various embodiments, is configured to search the data resource(s) 104 in response to receiving the notification generated by the discovery module 302. In some embodiments, the search module 304 is configured to continuously or substantially continuously search the data resource(s) 104 for the type(s) of topic and/or topic(s) related to a discovered computing device 102 and/or object 112. That is, the search module 304 can be configured to continuously or substantially continuously perform general searches and/or targeted searches of the data resource(s) 104 for the type(s) of topic and/or topic(s) related to a discovered computing device 102 and/or object 112.

In other embodiments, the search module 304 is configured to periodically or substantially periodically search the data resource(s) 104 for the type(s) of topic and/or topic(s) related to a discovered computing device 102 and/or object 112. That is, the search module 304 can be configured to periodically or substantially periodically perform general searches and/or targeted searches of the data resource(s) 104 for the type(s) of topic and/or topic(s) related to a discovered computing device 102 and/or object 112. A search period can include any suitable amount of time for searching the data resource(s) 104 and/or period of time between searches that is known or developed in the future.

The search module 304, in various embodiments, is configured to gather (and store) any data that is found related to the type(s) of topic, the topic(s), and/or any other relevant data related to a discovered computing device 102 and/or object 112. That is, the search module 304 is configured to gather (and store) any data that is found in a search in response to finding and/or identifying any data related to the type(s) of topic for the computing device 102 and/or object 112, specific topic(s) for the computing device 102 and/or object 112, and/or any data related to the computing device 102 and/or object 112. In certain embodiments, the found and stored data related to the type(s) of topic for the computing device 102 and/or object 112, specific topic(s) for the computing device 102 and/or object 112, and/or any data related to the computing device 102 and/or object 112 can include new data and/or trending data for the computing device 102 and/or object 112, among other types of data and/or specific data that is possible and contemplated herein.

Figure 3B:
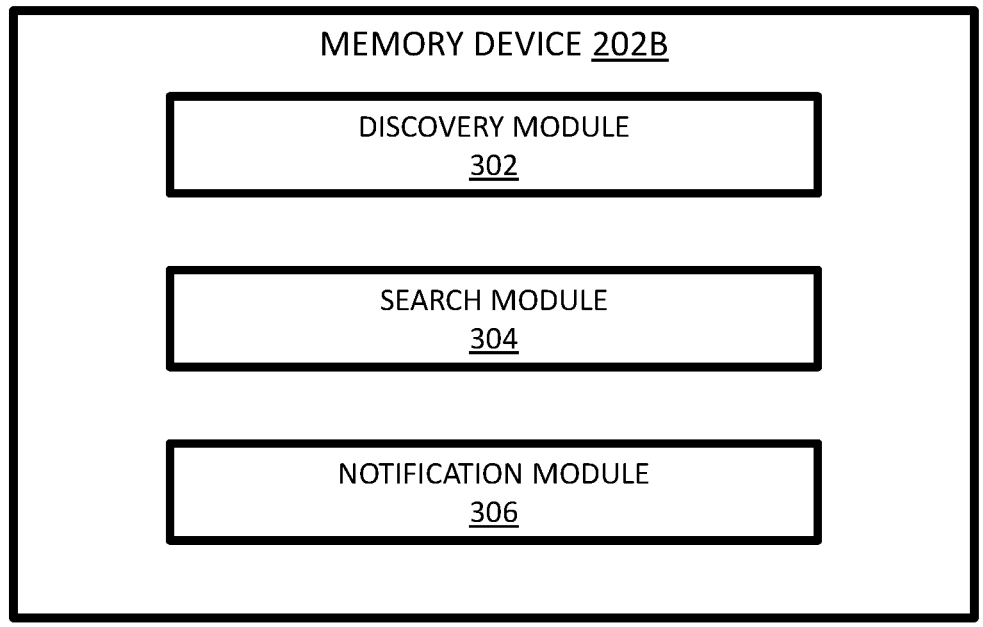

With reference to FIG. 3B, FIG. 3B is a block diagram of another embodiment of a memory device 202B. The memory device 202B includes a discovery module 302 and a search module 304 similar to the discovery module 302 and search module 304 included in the memory device 202A discussed with reference to FIG. 3A. At least in the illustrated embodiments, the memory device 202B further includes, among other components and/or features, a notification module 306.

In the embodiment illustrated in FIG. 3B, the search module 304 is further configured to generate and transmit a notification to the notification module 306 in response to gathering (and storing) data related to a discovered computing device 102 and/or object 112. The notification generated by the search module 304 can include the data gathered by the discovery module 302, which can include one or more topics in general related to the computing device 102 and/or object 112 and/or one or more targeted topics related to the computing device 102 and/or object 112, as discussed above. The notification module 306 is configured to receive and process the notification generated by the search module 304.

In some embodiments, the notification generated by the search module 304 can identify the source(s) (e.g., the data resource(s) 104) where the topic(s) and/or data related to the discovered computing device 102 and/or discovered object 112 is located and/or where the topic(s) and/or data can be found. In additional or alternative embodiments, the notification generated by the search module 304 can identify an address and/or location of the source(s) (e.g., the data resource(s) 104) where the topic(s) and/or data related to the discovered computing device 102 and/or discovered object 112 where the topic(s) and/or data are located and/or can be found.

A notification module 306 may include any suitable hardware and/or software that can generate and transmit notifications to a user of a host 106. In various embodiments, the notification module 306 is configured to generate notifications to a user that include the data related a discovered computing device 102 and/or discovered object 112.

The data related to a discovered computing device 102 and/or discovered object 112, in various embodiments, includes the data gathered by (and received from) the search module 304. That is, the data related to a discovered computing device 102 and/or discovered object 112 can include, among other suitable data and/or features, one or more recalls for a computing device 102 or object 112, one or more performance issues for a computing device 102 or object 112, one or more repairs for a computing device 102 or object 112, one or more warranties for a computing device 102 or object 112, and one or more new uses for a computing device 102 or object 112, among other types of topics and/or specific topics for a computing device 102 and/or or object 112, as discussed elsewhere herein.

The notification module 306 may notify a user and/or transmit the notification generated by the notification module 306 to a user using any suitable communication method, process, and/or technique that is known or developed in the future. That is, the notification module 306 can send a visual notification, an audio notification, and/or a tactile notification, etc. of the data and/or topic(s) related to a discovered computing device 102 and/or discovered object 112 to the user, among other communication methods, processes, and/or techniques that are possible and contemplated herein.

In addition, the notification module 306 may notify a user and/or transmit the notification generated by the notification module 306 to a user using any suitable communication device that is known or developed in the future. That is, the notification module 306 can utilize one or more visual devices (e.g., display(s), monitor(s), etc.), one or more audio devices (e.g., one or more speakers, earphones, earbuds, etc.), and/or one or more tactile devices (e.g., braille reader(s), teletypewriter(s), etc.), etc. to transmit the notifications generated by the notification module 306 to a user, among other communication devices that are possible and contemplated herein.

In some embodiments, the notification to a user generated by the notification module 306 can identify the source(s) (e.g., the data resource(s) 104) where the topic(s) and/or data related to the discovered computing device 102 and/or discovered object 112 is located and/or where the topic(s) and/or data can be found. In additional or alternative embodiments, the notification to the user generated by the notification module 306 can identify the data resource(s) 104 where the topic(s) and/or data related to the discovered computing device 102 and/or discovered object 112 where the topic(s) and/or data is located and/or can be found. In further additional or alternative embodiments, the notification to the user generated by the notification module 306 can include a link to the data resource(s) 104 where the topic(s) and/or data related to the discovered computing device 102 and/or discovered object 112 is located.

Continuing the non-limiting example discussed above related to the smart refrigerator may be helpful in further understanding the various embodiments disclosed herein. Its search of the data resource(s) 104 on the network 108 (e.g., on the Internet), the search module 304 would find the on-line forum discussing the water leak issue. In response to finding the on-line forum, the search module 304 will gather (and store) the data the search module 304 found related to the water leak issue for the smart refrigerator. The search module 304 can notify and/or transmit the gathered data related to the smart refrigerator to the notification module 306 and the notification module 306 can notify the user of the topic(s) and/or data related to the smart refrigerator found in the search. Further, a copy of the discussion related to the smart refrigerator and/or a link to the on-line forum may be included in the notice/notification from the notification module 306 transmitted to the user.

Referring back to FIG. 2A, a processor 204 may include any suitable non-volatile/persistent hardware and/or software configured to perform and/or facilitate performing functions and/or operations for automatically searching for topics related to discovered devices. In various embodiments, the processor 204 includes hardware and/or software for executing instructions in one or more modules and/or applications that can perform and/or facilitate performing functions and/or operations for automatically searching for topics related to discovered devices. The modules and/or applications executed by the processor 204 for automatically searching for topics related to discovered devices can be stored on and executed from a memory device 202 (e.g., memory device 202A and memory device 202B) and/or from the processor 204.

Figure 4A:
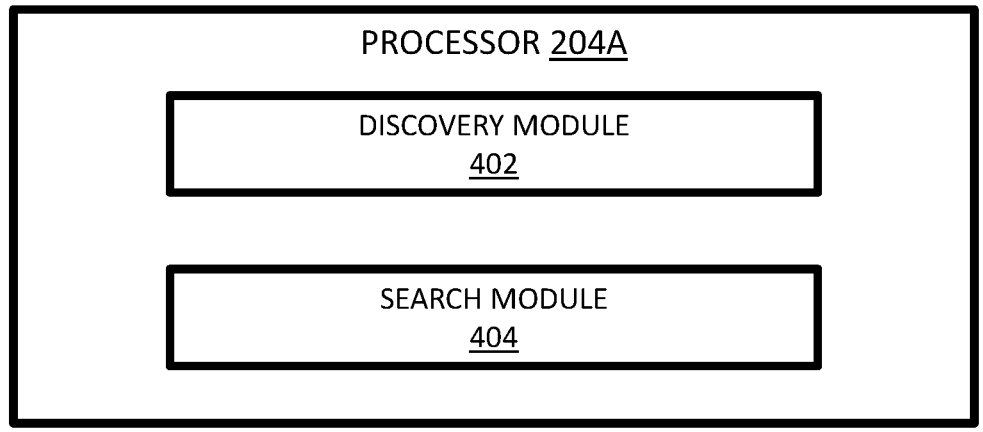
FIGS. 4A and 4B are schematic block diagrams illustrating various embodiments of a processor included in the host computing devices of FIGS. 2A through 2D.

With reference to FIG. 4A, FIG. 4A is a schematic block diagram of one embodiment of a processor 204A. At least in the illustrated embodiment, the processor 204A includes, among other components and/or features, a discovery module 402 and a search 404 similar to the discovery module 302 and search module 304, respectively, in the memory device 202A discussed with reference to FIG. 3A.

Figure 4B:
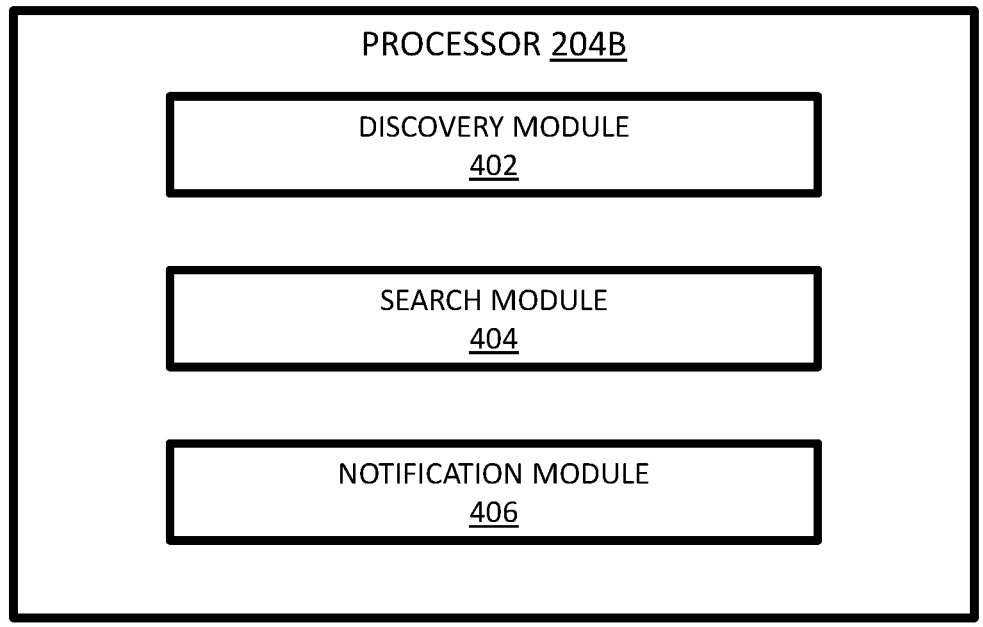

Referring to FIG. 4B, FIG. 4B is a schematic block diagram of another embodiment of a processor 204B. At least in the illustrated embodiment, the processor 204B includes, among other components and/or features, a discovery module 402, a search 404, and a notification module 406 similar to the discovery module 302, search module 304, and notification module 306, respectively, in the memory device 202B discussed with reference to FIG. 3A.

In FIG. 2A, set of I/O devices 206 may include an any suitable quantity of I/O devices 206. Further, the I/O device(s) 206 may include any suitable I/O device that is known or developed in the future. In various embodiments, the I/O device(s) 206 is/are configured to enable the host 106 to discover, communicate, and/or exchange data with the computing device(s) 102 over the network 108 or another network (see, e.g., network 110 in FIG. 1B) and the data resource(s) 104 over the network 108.

Referring to FIG. 2B, FIG. 2B is a block diagram of another embodiment of a host 106B. At least in the illustrated embodiment, the host 106B includes, among other components and/or features, a set of memory devices 202, a processor 204, a set of I/O devices 206, and a bus 210 similar to the memory device(s) 202, processor 204, I/O device(s) 206, and bus 210 included in the host 106A illustrated in FIG. 2A. A difference between the host 106B and the host 106A is that the memory device(s) 202 of the host 106B are included in and/or form a portion of the processor 204, whereas the memory device(s) 202 of the host computing device 106A are separate from and/or are device(s) that is/are independent from the processor 204.

With reference to FIG. 2C, FIG. 2C is a block diagram of another embodiment of a host 106C. At least in the illustrated embodiment, the host 106C includes, among other components and/or features, a set of memory devices 202, a processor 204, and a set of I/O devices 206 coupled to and/or in communication with one another via a bus 210 similar to the memory device(s) 202, processor 204, I/O device(s) 206, and bus 210 included in the host 106A illustrated in FIG. 2A. At least in the illustrated embodiment, the host 106C further includes, among other components and/or features, a set of sensor devices 208 coupled to and/or in communication with the memory device(s) 202, processor 204, and I/O device(s) 206 via the bus 210.

A set of sensor devices 208 may include any suitable quantity of sensor devices 208. In some embodiments, the set of sensor devices 208 includes one sensor device 208. In further embodiments, the set of sensor devices 208 includes two or more sensor devices 208.

The set of sensor devices 208 may include any suitable sensor device(s) 208 that is/are known or developed in the future that can detect, sense, and/or measure physical inputs as sensor data indicative of a set of properties and/or conditions of an environment surrounding a sensor device 208 (e.g., environment 114 in FIG. 1C). That is, the sensor device(s) 208 can include any suitable device that can read and/or measure motion, sound, light, temperature, speed, and/or electrical capacity, etc. as sensor data, among other types of inputs that can be utilized as sensor data to indicate and/or represent a set of properties and/or conditions of the environment 114 surrounding a sensor device 208 that are possible and contemplated herein. Example sensor devices 208 include, but are not limited to, an image sensor (e.g., a camera, a video recorder, a webcam, a thermal imager, a facial recognition device, a CMOS image sensor, etc.), an audio sensor (e.g., a microphone, etc.), a motion sensor (e.g., a gyroscope, a camera, etc.), and/or an RFID sensor/tag, a temperature sensor (e.g., a thermometer, thermal sensor, etc.), etc., among other types of sensing devices that are possible and contemplated herein.

In various embodiments, each sensor device 208 is configured to detect objects 112 (see, e.g., FIG. 1C) or representation of an object 112 in the environment 114. The object 112 may include any suitable object that can be detected and/or identified by a sensor device 208. In some embodiments, an object 112 includes a computing device 102. In certain embodiments, an object 112 includes a computing device 102 that is not coupled to and/or in communication with a host 106 via a network (e.g., network 108 and network 110). In additional or alternative embodiments, the object 112 includes a non-computing device, a non-smart computing device, and/or other type(s) of objects 112 and/or object(s) 112 for which related topics and/or related data can be stored on and/or found on the data resource(s) 104.

A representation of an object 112 may include any suitable representation and/or identifier that is known or developed in the future. Example, representations/identifiers can include, but are not limited to, a barcode, a QR code, an RFID tag, a serial number, and a UPC code, etc. among other representations/identifiers that are possible and contemplated herein.

In some embodiments, each sensor device 208 is configured to generate a sensor signal including sensor data indicating and/or representing a physical input corresponding to its particular type of sensor device 208. In various embodiments, the sensor signal(s) including the sensor data are generated by the sensor device(s) 208 in real-time as the sensor device(s) 208 are detecting, sensing, and/or measuring the physical input(s) indicative of the set of properties and/or conditions of the environment surrounding the sensor device(s) 208 that can detect and/or identify an object 112.

The sensor data can also indicate a make and/or model a detected object 112. That is, sensor data can enable a processor 204 to identify the particular make and/or model of a detected object 112 included in the sensor data.

In various embodiments, each sensor device 208 is configured to transmit its generated sensor signal(s) including the sensor data to a set of one or more memory devices 202 (e.g., memory device(s) 202A and memory device(s) 202B) and/or a processor 204 (e.g., processor 204A and processor 204B), as discussed elsewhere herein. Further, the memory device(s) 202 and/or the processor 204 is/are configured to receive the sensor data and use the sensor data to discover the object(s) 112 (a computing device 102) in the environment 114, as discussed elsewhere herein.

FIG. 2D is a block diagram of another embodiment of a host 106B. At least in the embodiment illustrated in FIG. 2D, the host 106D includes, among other components and/or features, a set of memory devices 202, a processor 204, a set of I/O devices 206, a set of sensor devices 208, and a bus 210 similar to the memory device(s) 202, processor 204, I/O device(s) 206, sensor device(s) 208, and bus 210 included in the host 106C illustrated in FIG. 2C. A difference between the host 106D and the host 106C is that the memory device(s) 202 of the host 106D are included in and/or form a portion of the processor 204, whereas the memory device(s) 202 of the host computing device 106C are separate from and/or are device(s) that is/are independent from the processor 204.

With reference again to FIG. 1A, the network 108 may include any suitable wired and/or wireless network 108 (e.g., public and/or private computer networks in any number and/or configuration (e.g., the Internet, an intranet, a cloud network, etc.)) that is known or developed in the future that enables the host 106 to be coupled to, communication with, and/or to share resources with the set of computing devices 102 and the set of data resources 104. In various embodiments, the network 108 can include the Internet, a cloud network (IAN), a wide area network (WAN), a local area network (LAN), a wireless local area network (WLAN), a metropolitan area network (MAN), an enterprise private network (EPN), a virtual private network (VPN), and/or a personal area network (PAN), among other examples of computing networks and/or or sets of computing devices connected together for the purpose of communicating, sharing data, and/or sharing resources with one another that are possible and contemplated herein.

Referring to FIG. 1B, FIG. 1B is a schematic diagram of another embodiment of a computing system 100B that can automatically search for topics related to discovered devices. At least in the embodiment illustrated in FIG. 1B, a computing system 100B includes a host 106 coupled to and/or in communication with a set of data resources 104 via a network 108 similar to the host 106, data resource(s) 104, and network 108 in the computing system 100A discussed with reference to FIG. 1A. The computing system 100B also includes a set of computing devices 102 (e.g., discovered and/or discoverable computing device(s) 102) similar to the computing device(s) 102 included in the computing system 100A discussed with reference to FIG. 1A. At least in the embodiment illustrated in FIG. 2B, the computing system 100B further includes, among other components and/or features, a network 110 coupling the host 106 and the computing device(s) 102 to one another.

As illustrated in FIG. 1B, the network 110 is a separate and/or different network from the network 108. A network 110 may include any suitable wired and/or wireless network 110 (e.g., public and/or private computer networks in any number and/or configuration that is known or developed in the future that enables the host 106 to be coupled to, communication with, and/or to share resources with the set of computing devices 102. In various embodiments, the network 110 can include a WAN, a LAN, a WLAN, a MAN, an EPN, a VPN, and/or a PAN, among other examples of computing networks and/or or sets of computing devices connected together for the purpose of communicating, sharing data, and/or sharing resources with one another that are possible and contemplated herein. In certain embodiments, the network 108 is a cloud network or the Internet.

With reference to FIG. 1C, FIG. 1C is a schematic diagram of yet another embodiment of a computing system 100C that can automatically search for topics related to discovered devices. At least in the embodiment illustrated in FIG. 1C, a computing system 100C includes a host 106 coupled to and/or in communication with a set of data resources 104 via a network 108 similar to the host 106, data resource(s) 104, and network 108 in the computing system 100A discussed with reference to FIG. 1A. At least in the embodiment illustrated in FIG. 2C, the computing system 100C further includes, among other components and/or features, a set of objects 112 (e.g., discoverable objects 112) in an environment 114 located proximate to the host 106.

An object 112 may include any suitable type(s) of object and/or object that is known or developed in the future capable of being detected and/or identified by a sensor device 208. In some embodiments, an object 112 can include a computing device 102. In certain embodiments, the computing device 102 is not coupled to and/or in communication with the host 106. Other example objects 112 can include, but are not limited to, non-computing devices, non-smart computing devices, household appliances (e.g., microwave oven, oven, vacuum, blender, iron, air fryer, sewing machine, etc.), vehicles (e.g., automobile, truck, bicycle, motorcycle, etc.), exercise equipment, sports equipment, manufacturing equipment, design equipment, office equipment, business equipment, etc., among other objects and/or devices that can experience issues related to recalls, performance, warranty, repair, and new/different use, etc. that are possible and contemplated herein.

Some non-limiting examples an issue may include but are not limited to, a device (e.g., television, hoverboard, etc.) catching fire and a device (e.g., an outdoor security camera) not functioning properly in certain temperature conditions (e.g., too hot or too cold). Example repairs, preventions, and/or fixes for these issues may include, but are not limited to, not operating the device (e.g., television, hoverboard, etc.) longer than a set length of time (e.g., five hours) so it does not overheat and catch fire and operate the device (e.g., outdoor security camera) at 2.4 Ghz WiFi instead of 5 Ghz WiFi when the outside temperate is greater than 37° C. Further, warranty data may be gathered for each discovered computing device 102 and/or discovered object 112 so that the user is aware of the warranty period, what is covered/not covered under a warranty, and/or what can void a warranty.

An environment 114 may include any suitable environment that can house a host 106 and one or more objects 112 and/or within which a host 106 and the object(s) 112 can reside. Example environments 114 may include, but are not limited to, a home, a school, a place of business (e.g., office), and a place of recreation, etc., among other environments that can house a host 106 and one or more objects 112 and/or within which a host 106 and the object(s) 112 can reside that are possible and contemplated herein.

While the various embodiments have been discussed above with reference to discovering and searching the data resource(s) 104 for data/topics related to a single computing device 102/object 112, the various embodiments are not limited to these embodiments. That is, various other embodiments contemplate discovering and searching the data resource(s) 104 for data/topics related to multiple computing devices 102 and/or objects 112, both serially and/or in parallel. Further, the data resource(s) 104 may be continually, substantially continually, or periodically search for data/topics related to multiple computing devices 102 and/or objects 112, both serially and/or in parallel.

Figure 5:
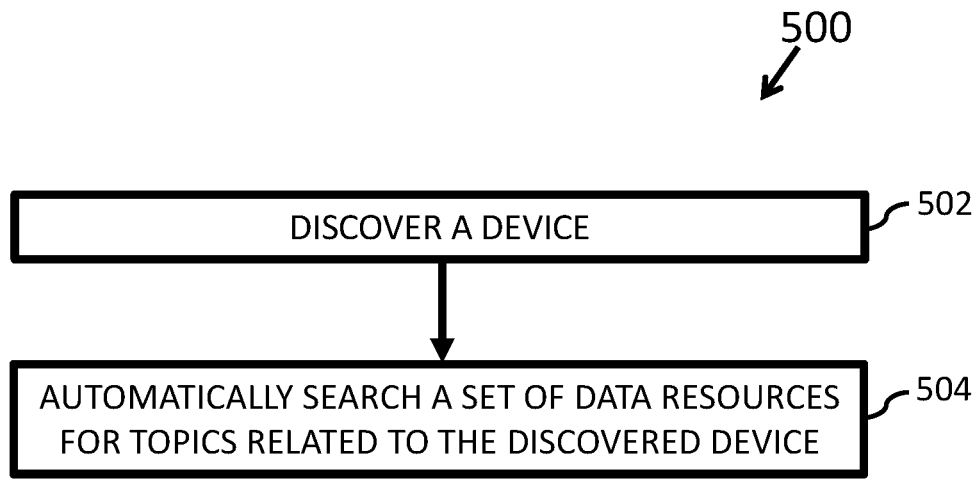
FIG. 5 is a schematic flow chart diagram illustrating one embodiment of a method for automatically searching for topics related to a discovered device.

FIG. 5 is a schematic flow chart diagram illustrating one embodiment of a method 500 for automatically searching for topics related to discovered devices. At least in the illustrated embodiment, the method 500 begins by a processor (e.g., processor 204) discovering a device (e.g., a computing device 102 or object 112) (block 502). The processor 204 can discover the device using any of the various embodiments, operations, and/or functions of a processor 204 for discovering the device discussed elsewhere herein.

In some embodiments, the method 500 further includes the processor 204 automatically (or proactively) searching a set of data resources 104 (e.g., one or more data resources 104) for topics and/or data related to the discovered device (block 504). The processor 204 may search the set of data resources 104 for the topic(s) and/or data related to the discovered device (e.g., on the Internet) using any of the various embodiments, operations, and/or functions of a processor 204 for searching the data resource(s) 104 discussed elsewhere herein.

Figure 6:
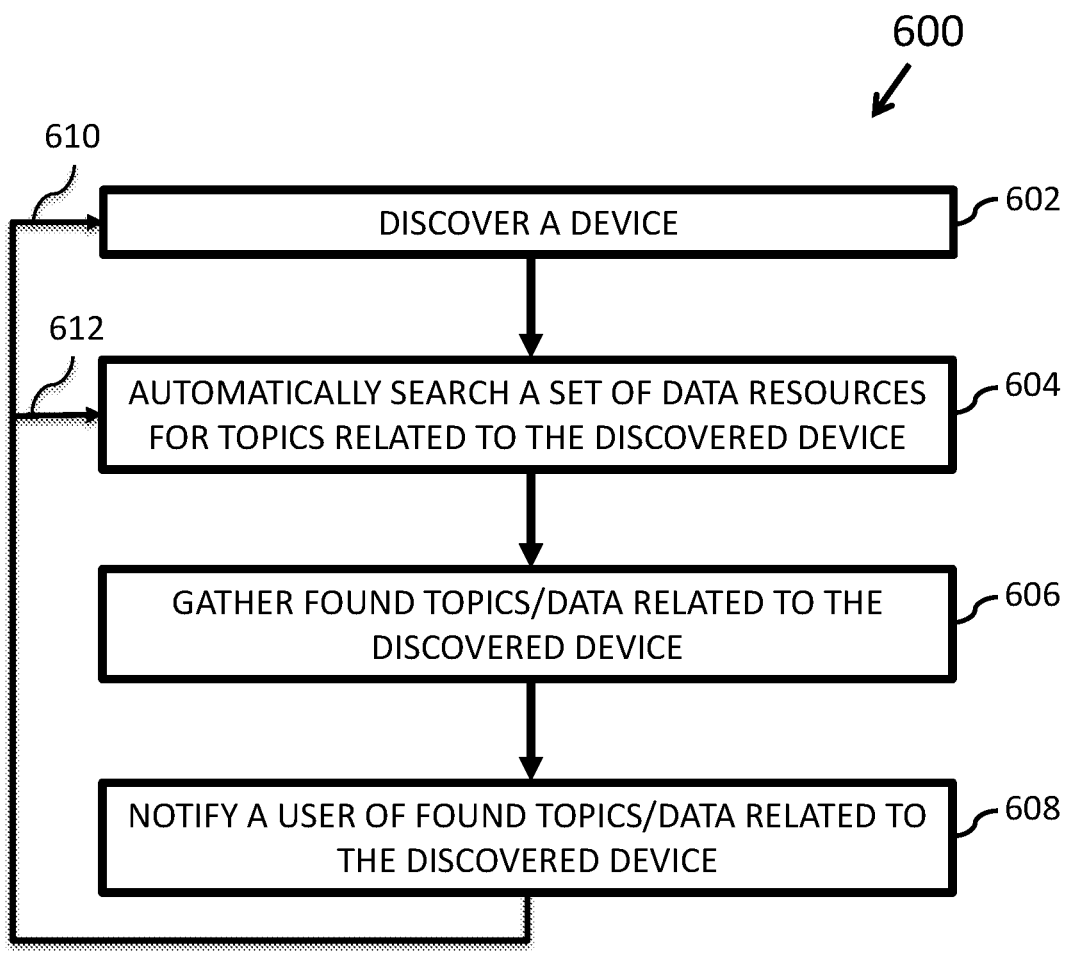
FIG. 6 is a schematic flow chart diagram illustrating another embodiment of a method for automatically searching for topics related to a discovered device.

FIG. 6 is a schematic flow chart diagram illustrating another embodiment of a method 600 for automatically searching for topics related to discovered devices. At least in the illustrated embodiment, the method 600 begins by a processor (e.g., processor 204) discovering a device (e.g., a computing device 102 or object 112) (block 602). The processor 204 can discover the device using any of the various embodiments, operations, and/or functions of a processor 204 for discovering the device discussed elsewhere herein.

In some embodiments, the method 600 further includes the processor 204 automatically (or proactively) searching a set of data resources 104 (e.g., one or more data resources 104) for topics and/or data related to the discovered device (block 604). The processor 204 may search the set of data resources 104 for the topic(s) and/or data related to the discovered device (e.g., on the Internet) using any of the various embodiments, operations, and/or functions of a processor 204 for searching the data resource(s) 104 discussed elsewhere herein.

The processor 204 gathers any data and/or topics related to the discovered device that is found during the search (block 606) and notifies the user of any data and/or topics that are found related to the discovered device (block 608). The user may be notified using any of the various embodiments, operations, and/or functions for notifying a user of any data and/or topics that are found related to the discovered device, as discussed elsewhere herein. Further, the notification can identify the data source(s) 104 where the data and/or topics can be found and/or may include a link to the data source(s) 104 where the data and/or topics can be found, as discussed elsewhere herein.

The processor 206 can repeat blocks 602 to 608 for each newly discovered device (return 610). Further, the processor 206 can repeat blocks 604 to 608 on a continual, substantially continual, or periodic basis for each previously discovered device (return 612).

Figure 7:
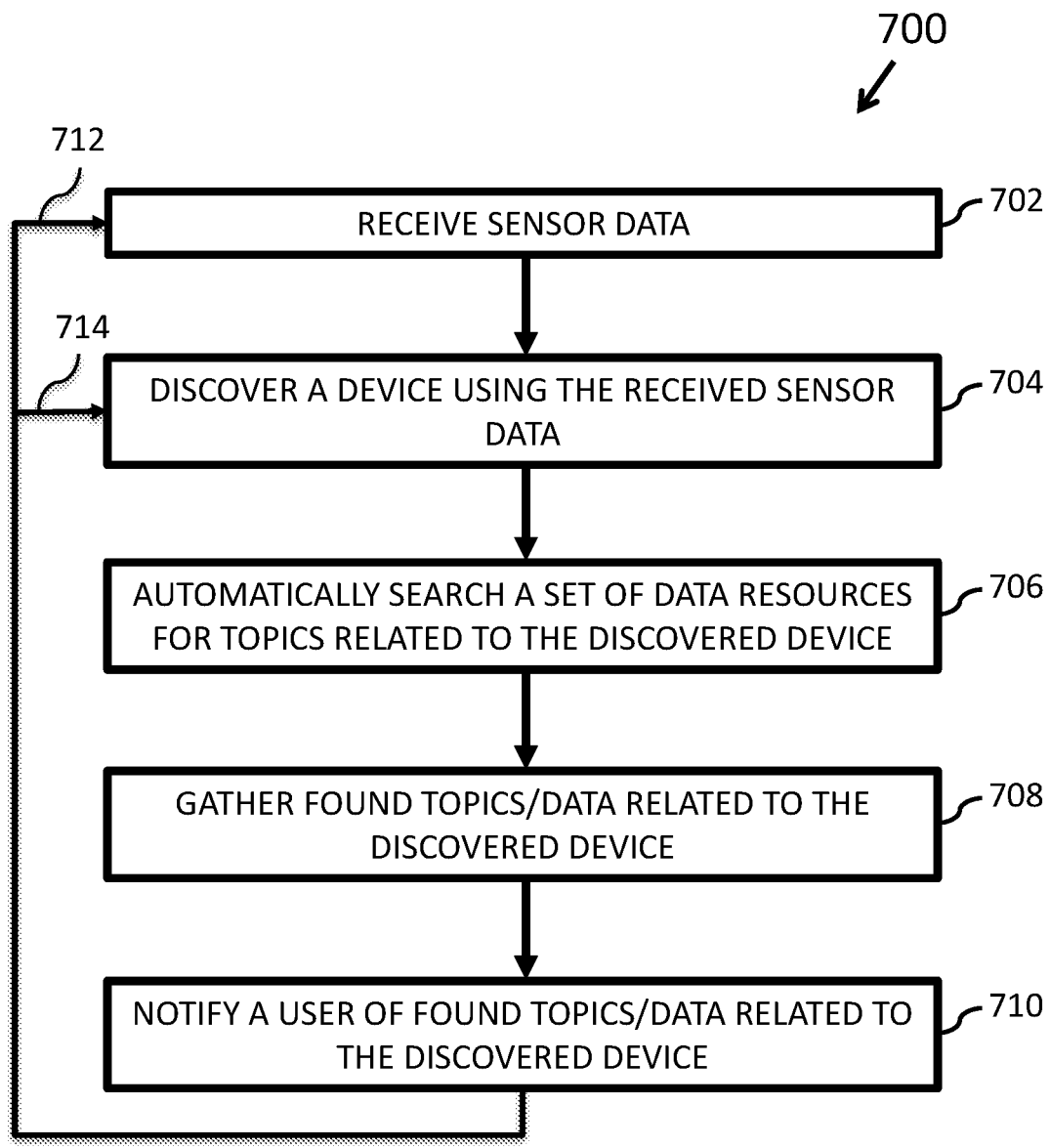
FIG. 7 is a schematic flow chart diagram illustrating yet another embodiment of a method for automatically searching for topics related to a discovered device.

FIG. 7 is a schematic flow chart diagram illustrating yet another embodiment of a method 700 for automatically searching for topics related to discovered devices. At least in the illustrated embodiment, the method 700 begins by a processor (e.g., processor 204) receiving sensor data from a set of sensor devices 208 (block 702) and uses the sensor data to discover a device (e.g., a computing device 102 or object 112) (block 704). The processor 204 can discover the device using the sensor data via any of the various embodiments, operations, and/or functions of a processor 204 for discovering the device via sensor data discussed elsewhere herein.

In some embodiments, the method 700 further includes the processor 204 automatically (or proactively) searching a set of data resources 104 (e.g., one or more data resources 104) for topics and/or data related to the discovered device (block 706). The processor 204 may search the set of data resources 104 for the topic(s) and/or data related to the discovered device (e.g., on the Internet) using any of the various embodiments, operations, and/or functions of a processor 204 for searching the data resource(s) 104 discussed elsewhere herein.

The processor 204 gathers any data and/or topics related to the discovered device that is found during the search (block 708) and notifies the user of any data and/or topics that are found related to the discovered device (block 710). The user may be notified using any of the various embodiments, operations, and/or functions for notifying a user of any data and/or topics that are found related to the discovered device, as discussed elsewhere herein. Further, the notification can identify the data source(s) 104 where the data and/or topics can be found and/or may include a link to the data source(s) 104 where the data and/or topics can be found, as discussed elsewhere herein.

The processor 206 can repeat blocks 702 to 710 for each newly discovered device (return 712). Further, the processor 206 can repeat blocks 704 to 710 on a continual, substantially continual, or periodic basis for each previously discovered device (return 714).

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
  a processor; and
  a memory configured to store code executable by the processor to:
    electrically discover an external device that is in communication with the processor,
    receive information about the external device directly from the external device, in response to electrically discovering the external device and using the information related to the external device, automatically search the Internet to discover a set of topics related to performance issues for the external device that are currently trending on the Internet, in response to finding one or more currently trending topics related to performance issues for the external device on the Internet, gather data from the Internet about each currently trending topic that is related to performance issues for the external device, and in response to gathering the data from the Internet, transmit a link to a source of each currently trending topic on the Internet that is related to performance issues for the external device to the user.

2. The apparatus of claim 1, wherein the set of topics that are currently trending on the Internet related to the performance issues for the external device comprises at least one of a recall related to the performance issues for the external device, a warranty related to the performance issues for the external device, and a repair related to the performance issues for the external device.

3. The apparatus of claim 2, wherein the processor is further configured to notify a user of any topics that are currently trending on the Internet related to performance issues for the external device that are found while searching the Internet.

4. The apparatus of claim 1, wherein:
the external device is a smart device; and
the processor and the smart device are in communication with one another via the Internet.

5. The apparatus of claim 1, wherein:
the device is a smart device;
the processor and the smart device are in communication with one another via a network different than the Internet; and
the processor is in communication with the Internet.

6. The apparatus of claim 1, further comprising:
a set of sensor devices in communication with the processor, the set of sensor devices configured to:
detect the external device in an environment surrounding the set of sensor devices,
generate sensor data that includes detection of the external device, and
transmit the sensor data to the processor,
wherein the processor is configured to:
receive the sensor data, and
utilize the sensor data to discover the external device.

7. The apparatus of claim 6, wherein:
the processor is further configured to:
identify at least one of a device type and a device model for the external device via the sensor data, and
utilize the at least one of the device type and the device model in automatically searching the Internet for the set of topics that are currently trending on the Internet related to performance issues for the external device.

8. A method, comprising:
electrically discovering, by a processor, an external device that is in communication with the processor;
receiving information about the external device directly from the external device;
in response to electrically discovering the external device and using the information related to the external device, automatically searching the Internet to discover a set of topics related to performance issues for the external device that are currently trending on the Internet;

in response to finding one or more currently trending topics related to performance issues for the external device on the Internet, gathering data from the Internet about each currently trending topic that is related to performance issues for the external device; and in response to gathering the data from the Internet, transmitting a link to a source of each currently trending topic on the Internet that is related to performance issues for the external device to the user.

9. The method of claim 8, wherein the set of topics that are currently trending on the Internet related to the performance issues for the external device comprises at least one of a recall related to the performance issues for the external device, a warranty related to the performance issues for the external device, and a repair related to the performance issues for the external device.

10. The method of claim 9, further comprising:
notifying a user of any topics that are currently trending on the Internet related to performance issues for the external device that are found while searching the Internet.

11. The method of claim 8, wherein:
the external device is a smart device; and
the processor and the smart device are in communication with one another via the Internet.

12. The method of claim 8, wherein:
the device is a smart device;
the processor and the smart device are in communication with one another via a network different than the Internet; and
the processor is in communication with the Internet.

13. The method of claim 8, further comprising:
receiving, by the processor from a set of sensor devices, sensor data detecting the external device in an environment surrounding the set of sensor devices,
wherein the external device is electrically discovered via the sensor data.

14. The method of claim 13, further comprising:
identifying at least one of a device type and a device model for the external device via the sensor data; and
utilizing the at least one of the device type and the device model in automatically searching the Internet for the set of topics that are currently trending on the Internet related to performance issues for the external device.

15. A computer program product comprising a non-transitory computer-readable storage device including code embodied therewith, the code executable by a processor to cause the processor to:
electrically discover an external device that is in communication with the processor;
receive information about the external device directly from the external device;
in response to electrically discovering the external device and using the information related to the external device, automatically search the Internet to discover a set of topics related to performance issues for the external device that are currently trending on the Internet;
in response to finding one or more currently trending topics related to performance issues for the external device on the Internet, gather data from the Internet about each currently trending topic that is related to performance issues for the external device; and in response to gathering the data from the Internet, transmit a link to a source of each currently trending topic on the Internet that is related to performance issues for the external device to the user.

16. The computer program product of claim 15, wherein:

the set of topics that are currently trending on the Internet related to the performance issues for the external device comprises at least one of a recall related to the performance issues for the external device, a warranty related to the performance issues for the external device, and a repair related to the performance issues for the external device; and the code further causes the processor to notify a user of any topics that are currently trending on the Internet related to performance issues for the external device that are found while searching the Internet.

17. The computer program product of claim 15, wherein:

the external device is a smart device; and the processor and the smart device are in communication with one another via the Internet.

18. The computer program product of claim 15, wherein:

the device is a smart device;

the processor and the smart device are in communication with one another via a network different than the Internet; and the processor is in communication with the Internet.

19. The computer program product of claim 15, wherein the code further causes the processor to:

receive, from a set of sensor devices, sensor data detecting the external device in an environment surrounding the set of sensor devices, wherein the external device is electrically discovered via the sensor data.

20. The computer program product of claim 19, wherein the code further causes the processor to:

identify at least one of a device type and a device model for the external device via the sensor data; and utilize the at least one of the device type and the device model in automatically searching the Internet for the set of topics that are currently trending on the Internet related to performance issues for the external device.

* * * * *